UNITED STATES PATENT OFFICE.

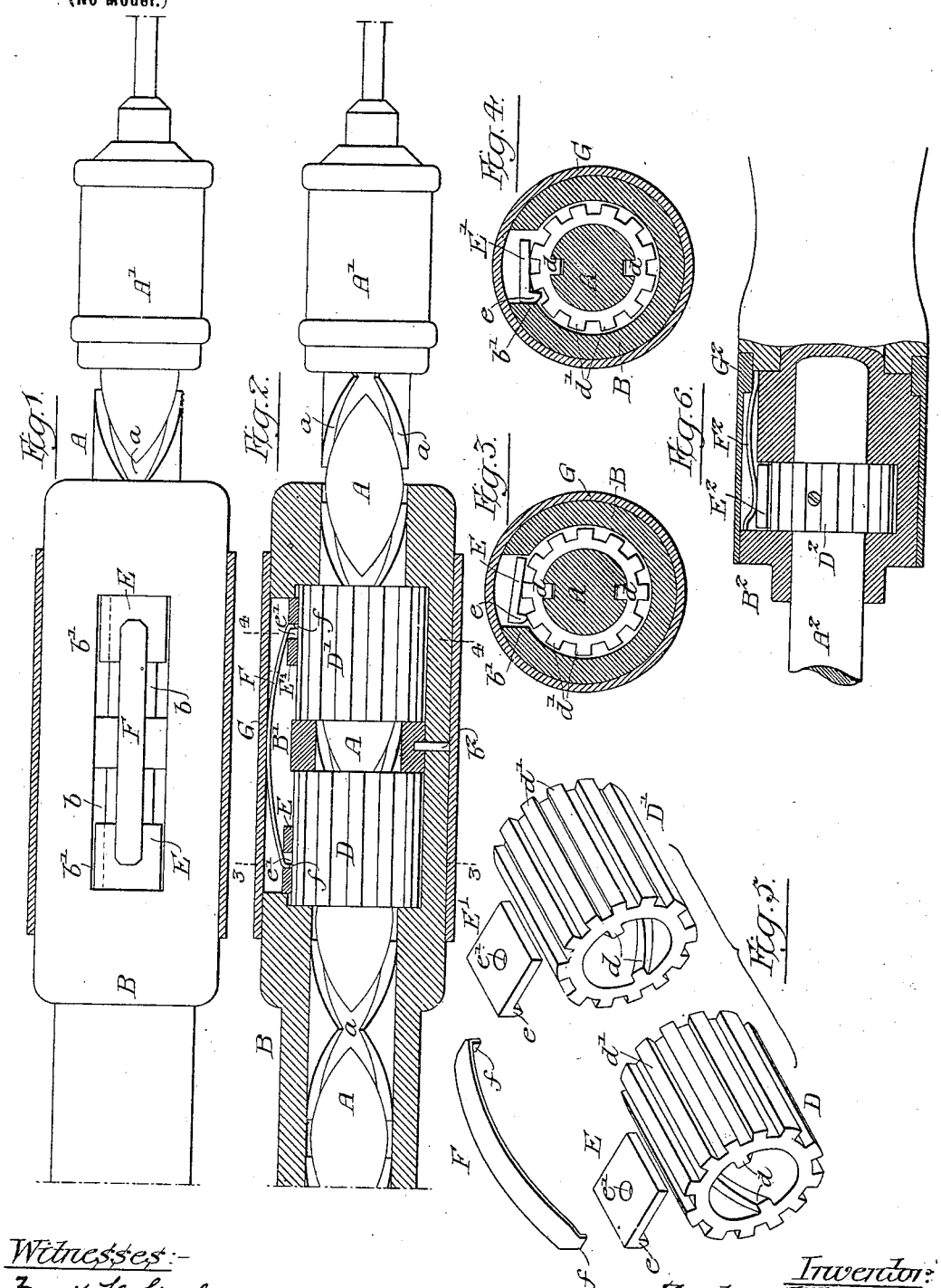

ZACHRY T. FURBISH, OF PHILADELPHIA, PENNSYLVANIA, ASSIGNOR TO THE NORTH BROTHERS MANUFACTURING COMPANY, OF SAME PLACE.

RATCHET MECHANISM.

SPECIFICATION forming part of Letters Patent No. 659,521, dated October 9, 1900.

Application filed June 14, 1898. Serial No. 683,438. (No model.)

*To all whom it may concern:*

Be it known that I, ZACHRY T. FURBISH, a citizen of the United States, residing in Philadelphia, Pennsylvania, have invented certain Improvements in Ratchet Mechanism, of which the following is a specification.

My invention relates to certain improvements in ratchet mechanism in which a pawl is confined between a ratchet-wheel and an abutment.

One object of my invention is to so construct ratchet mechanism of this type that the pivots for the pawls can be dispensed with; and a further object is to cheaply manufacture the mechanism and readily apply it to the stocks of tools—such as ratchets, screwdrivers, or drills.

In the accompanying drawings, Figure 1 is a plan view of my improved ratchet-tool with the casing in section. Fig. 2 is a longitudinal sectional view. Fig. 3 is a transverse sectional view on the line 3 3, Fig. 2. Fig. 4 is a transverse sectional view on the line 4 4, Fig. 2. Fig. 5 is a detached perspective view of the ratchet-wheel, pawls, and spring; and Fig. 6 is a view illustrating a single pawl and ratchet.

A is a spindle of a ratchet-drill having double spiral grooves $a\ a$ cut therein and having at the ends a chuck A', adapted to hold a drill or other bit.

B is the hub, mounted on the spindle and containing the two ratchet-wheels D D', which have internal lugs $d$, adapted to travel in the spiral grooves $a$, the lugs on the spindle D resting in one spiral groove and the lugs of the other wheel D' resting in the other spiral groove, so if these wheels are not controlled and the hub is moved on the spindle longitudinally one wheel will move to the right and the other to the left. The hub B is cut out at $b$, forming an abutment $b'$ for the pawls E E' to rest against. These pawls, which are clearly illustrated in Fig. 5, have a rib $e$ at one end, which engages with the teeth $d'$ of a ratchet-wheel, and, as shown clearly in Figs. 3 and 4, in order to keep these pawls in place on the ratchet-wheels I use in the present instance a spring F, which rests against the casing G and has lips $f\ f$, which enter opening or cavities $e'$ in the pawls, so that the pawls are kept in place by the spring. The outer edge of the ribs $e$ of the pawls is slightly rounded, so that they may be readily pushed out of the way by the teeth of the ratchet-wheels when said wheels are moving in the reverse direction, as shown in Fig. 3.

In the present instance I have shown a separating-ring B' mounted on the spindle A between the ratchet-wheels D D' and secured to the hub B by a pin $b^2$.

It will be seen that the spindle will be moved continuously in one direction as the hub B is reciprocated, as on the downstroke one pawl engages the teeth of a ratchet-wheel and holds said wheel so as to make the spindle turn with it as its lug is adapted to one of the spiral grooves, the other wheel being free. On the return stroke, however, the wheel that was free is locked by its pawl and the wheel that was locked is free, so that the spindle is turned in the same direction as before, as the lug on the locked wheel is adapted to the other spiral groove of the spindle.

In Fig. 6 I have shown a ratchet-tool of a simpler form and which may be used on a plain ratchet screw-driver. The wheel $D^2$ is secured to a spindle $A^2$, and the hub $B^2$ is slotted, so as to receive the wheel, and bored for the spindle. The pawl $E^2$ is mounted in a cavity in the hub $B^2$ and is held in position by a spring $F^2$, one end of which is confined between the casing $D^2$ and the hub $B^2$.

I claim as my invention—

1. The combination of a spindle having reverse spiral grooves therein, a hub having a slot providing abutments mounted on the spindle, two ratchet-wheels mounted within the hub and on the spindle, a spacing-disk arranged between said ratchet-wheels, one wheel having lugs adapted to one groove of the spindle, and the other wheel having lugs adapted to the other groove of the spindle, pawls arranged at each end of the slot in the hub and adapted to lie over the ratchet-wheels, ribs on the said pawls adapted to be confined between one of the teeth of its ratchet-wheel and the abutment of the hub, and a spring in positive engagement with the pawls and serving to control the same, so that when the hub is reciprocated the spindle will be moved continuously in one direction.

2. The combination of a slotted hub forming abutments, a spindle adapted to the hub, said spindle having reverse spiral grooves, two ratchet-wheels mounted on the spindle within the hub, one wheel having lugs adapted to one spiral groove and the other wheel having lugs adapted to the other spiral groove, a spacing-disk arranged between said ratchet-wheels, two pawls mounted on the ratchet-wheels within the slot of the hub and having ribs adapted to be confined between one of the teeth of the wheels and the abutment of the hub, a spring resting on both pawls and having projections at each side entering recesses in the pawls, and a casing inclosing the hub and secured to the spacing-disk, confining said pawls and their springs in place, substantially as described.

In testimony whereof I have signed my name to this specification in the presence of two subscribing witnesses.

ZACHRY T. FURBISH.

Witnesses:
WILL. A. BARR,
JOS. H. KLEIN.